United States Patent [19]

Kranz et al.

[11] 4,325,116

[45] Apr. 13, 1982

[54] PARALLEL STORAGE ACCESS BY MULTIPROCESSORS

[75] Inventors: Roger H. Kranz; Edwin J. de Araujo Pinheiro, both of Rochester, Minn.; James A. Tuttle, Marietta, Ga.

[73] Assignee: International Business Machines Corporation, Armonk, N.Y.

[21] Appl. No.: 68,372

[22] Filed: Aug. 21, 1979

[51] Int. Cl.³ .................... G06F 13/00; G11C 8/00; G11C 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,555,513 | 10/1967 | Hauck et al. | 364/200 |
| 3,566,363 | 2/1971 | Driscoll, Jr. | 364/200 |
| 3,593,302 | 7/1971 | Saito et al. | 364/200 |
| 3,735,360 | 5/1973 | Anderson et al. | 364/200 |
| 3,886,525 | 5/1975 | Brown et al. | 364/200 |
| 3,896,418 | 7/1975 | Brown | 364/200 |
| 3,921,145 | 11/1975 | Emm et al. | 364/200 |
| 3,934,232 | 1/1976 | Curley et al. | 364/200 |
| 3,959,775 | 5/1976 | Valassis et al. | 364/200 |
| 3,984,819 | 10/1976 | Anderson | 364/200 |
| 4,034,347 | 7/1977 | Probert | 364/200 |
| 4,118,771 | 10/1978 | Pomella et al. | 364/200 |
| 4,128,881 | 12/1978 | Yamamoto et al. | 364/200 |
| 4,156,904 | 5/1979 | Minowa et al. | 364/200 |
| 4,212,057 | 7/1980 | Devlin et al. | 364/200 |

*Primary Examiner*—Raulfe B. Zache
*Assistant Examiner*—John G. Mills
*Attorney, Agent, or Firm*—Donald F. Voss

[57] ABSTRACT

A computer system having two processors and storage where storage is segmented so as to permit simultaneous access by the two processors with the address path of one processor being limited to a particular segment of storage so as to eliminate contention in other segments. One processor can address all segments of storage and place processed data into and retrieve data from the segment of storage accessible by the other processor. This eliminates the need for cycle stealing because the other processor can access processed data or store data while the one processor simultaneously accesses another segment of storage. Storage contention is resolved on the basis of addressing. If both processors are simultaneously trying to address the same segment of storage, the processor which can address all segments of storage is granted the access.

5 Claims, 8 Drawing Figures

PARALLEL STORAGE ACCESS BY MULTIPROCESSORS

DESCRIPTION

1. Technical Field

This invention relates to a computer system including at least two processors connected for parallel access of storage. The principal objects of the invention are to provide an improved multiprocessor parallel access to storage computer system which:

(a) eliminates the need for cycle stealing;
(b) increases the bandwidth of storage;
(c) reduces data transfer time;
(d) reduces storage capacity requirements;
(e) permits simultaneous access to the storage address space by two or more hardware interfaces;
(f) permits accurate timing loops by microcode;
(g) permits tight timing tolerances for work which must be done by a microprocessor;
(h) allows a microprocessor to service time critical events with no delay caused by storage contention;
(i) eliminates the need for intermediate buffers to buffer incoming data; and
(j) resolves storage contention by utilizing address information.

These objects are achieved by structuring the computer system so that one processor can address a first section of storage directly and a second section of storage through a storage switch. The second processor can only address the second area of storage through the storage switch. The storage switch is arranged so that if both processors are addressing the second section of storage, the address from the second processor will not be passed to the second section of storage. However, if the first processor is addressing the first section of storage, then the storage switch will pass the address from the second processor to permit it to address the second section of storage simultaneously with the addressing of the first section of storage by the first processor. The first processor can never be locked out of the shared storage section because it has control over the switching of the address and data to and from the second section of storage.

The invention finds particular utility in a computer subsystem where first and second processors are used for controlling an I/O device, for example a printer. Processor one would receive the data to be printed and process this data so that processor two could use the processed data for controlling the printer. The data processed by processor one would be placed by processor one into the shared storage area, i.e., the second section of storage. This processed data would then be retrieved by processor two. Also, processor two can place data into the shared storage area where it will be retrievable by processor one. Processor one, which can preempt processor two from the shared storage area, is aware of the need for processor two to retrieve the processed data from the shared area of storage and thus does not address the shared storage area so as not to conflict with processor two. On the other hand, if processor two were to malfunction, processor one, which can sense the status of processor two, can access the shared storage area without interference from processor two. Of course, since processor two can access the shared storage area, the need for cycle stealing from processor one is eliminated. Also because both processors can access storage simultaneously, the band width of storage is increased.

2. Background Art

Storage sharing is well known in the art, but the prior art does not show an arrangement where two processors can access storage simultaneously and where one processor can preempt the other from accessing the shared storage area.

U.S. Pat. No. 3,247,488 discloses a combination of a storage connected to a plurality of computers where each of the computers may be periodically connected to storage during certain but different predetermined instances of time. U.S. Pat. No. 4,128,881 also discloses a storage shared by multiple processors but only one processor can access storage at any one time. A non-unique address from one of the processors is modified so that the common storage is addressed with a unique fixed address. In the present invention, there is no modification of a non-unique address to a unique address. Rather, the address presented by one processor is examined to determined if it is accessing a particular segment of storage and if it is, it locks out the address from the other processor.

U.S. Pat. No. 4,156,904 discloses a computer system having a single storage shared by multiple processors. Storage is shared on a time basis. One processor does not require full time use of storage. The second processor monitors the use of storage by the first processor. When the first processor is not using storage, the second processor can use it. If the second processor has not obtained a sufficient number of cycles, it can block the first processor from use of storage and take the required storage cycles. Storage, however, cannot be accessed simultaneously by the processors. In the present invention, two processors can access storage simultaneously.

The IBM 9020 multisystem operation is a computer system consisting of several storage elements shared by computing elements and I/O control elements. The storage element accessed by each computing or I/O control element is controlled by an address translation register. The purpose of the address translation register is to allow a program to run in a different section of storage if the storage area dictated by its addressing range is occupied or is otherwise unavailable. The address translation registers do not provide for a parallel storage access. They are used to facilitate relocation and to keep programs from interacting with one another. The present invention does not use address translation registers for resolving storage addressing conflicts. Further the present invention permits parallel access of storage.

DISCLOSURE OF INVENTION

Figure 1:
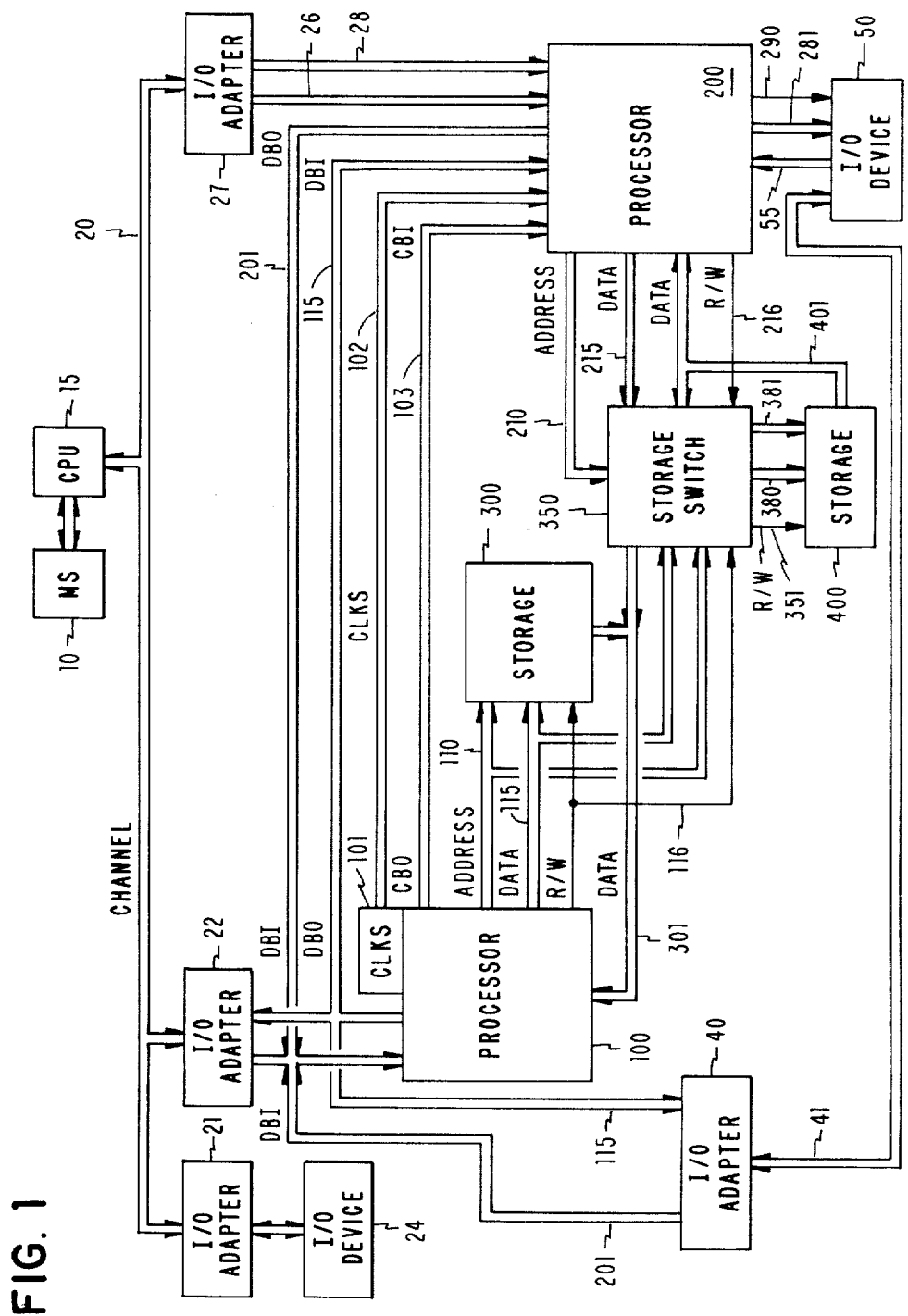
FIG. 1 is a block diagram illustrating a computer system incorporating the present invention.

With reference to the drawings and particularly to FIG. 1., the invention is illustrated by way of example as being incorporated in a computer system including a central processing unit (CPU) 15 connected to main storage 10 and channel 20. Channel 20 connects to I/O adapters 21, 22 and 27. I/O adapter 21 connects to I/O device 24. Adapter 22 connects with processor 100 via buses 115 and 201. Adapter 27 connects with processor 200 via buses 26 and 28. I/O device adapter 40 connects to I/O device 50 via bidirectional bus 41.

I/O device adapter 40 is connected to processor 100 via data bus out (DBO) 115 and data bus in (DBI) 201. Processor 200 has its data bus out (DBO) 201 connected as a data bus in (DBI) to processor 100. Data bus in (DBI) 115 of processor 200 is the data bus out (DBO) of processor 100.

In this example, processor 200 uses the clock signals from clock logic 101 of processor 100. The clock signals from processor 100 are passed from clock logic 101 via clock bus 102 to processor 200. The command bus out (CBO) 103 of processor 100 is connected to command bus in (CBI) of processor 200.

Processor 100 has its address bus 110 connected to storage 300 and to storage 400 via storage switch 350. Storages 300 and 400 are shown as separate storages but they have been implemented as a single storage in a prefered embodiment of the invention. In one preferred embodiment of the invention, the single storage consisted of 8K bytes of storage divided into four 2K storage areas where one of the 2K storage areas, i.e., area two, was shared between processors 100 and 200.

The data bus (DBO) 115 connects from processor 100 to storage 300 and to storage 400 via switch 350. A read/write control line 116 from processor 100 connects to storage 300 and to storage switch 350. Processor 200 has its address bus 210 and its data bus 215 connected to storage switch 350. Data from storage switch 350 is applied to storage 400 via bus 380. Data from storage 300 is returned to processor 100 via data bus 301. Data from storage 400 is returned directly to processor 200 via bus 401 and to processor 100 via storage switch 350. Read/write line 351 controls the reading and writing of storage 400.

Processorr 100, FIGS. 3A, 3B, 3C and 3D is of the type shown and described in the IBM System/34 5340 System Unit Theory Diagrams Manual, copyrighted 1977 by International Business Machines Corporation which is incorporated herein by reference. Processor 100 is referred to in the referenced manual as an attachment controller and is described starting on Page 10-1 and continuing through Page 10-5 of the manual. Processor 100 includes storage address register (SAR)109, FIG. 3C, for providing an address to storages 300 and 400 via address bus 110. SAR 109 is a 16 bit register where the bits are numbered zero through three (0-3), and are called XSAR bits, and bits zero through eleven (0-11) which are called SAR bits.

SAR 109 can be loaded from four sources via select logic 108. It can be loaded from instruction address register (IAR) 107 via bus 106 when the next sequential instruction is the instruction to be fetched. When a data byte read or data byte write to storage instruction is to be executed, SAR 109 is loaded with an address from data address registers (DARS) 125 FIG. 3D, via bus 126. For branch type instructions and storage direct instructions, SAR 109 is loaded from the operation register 130, FIG. 3A, via bus 131. For branch and link instructions, SAR 109 is loaded with an address from link register 135 via bus 136.

Figure 3A:
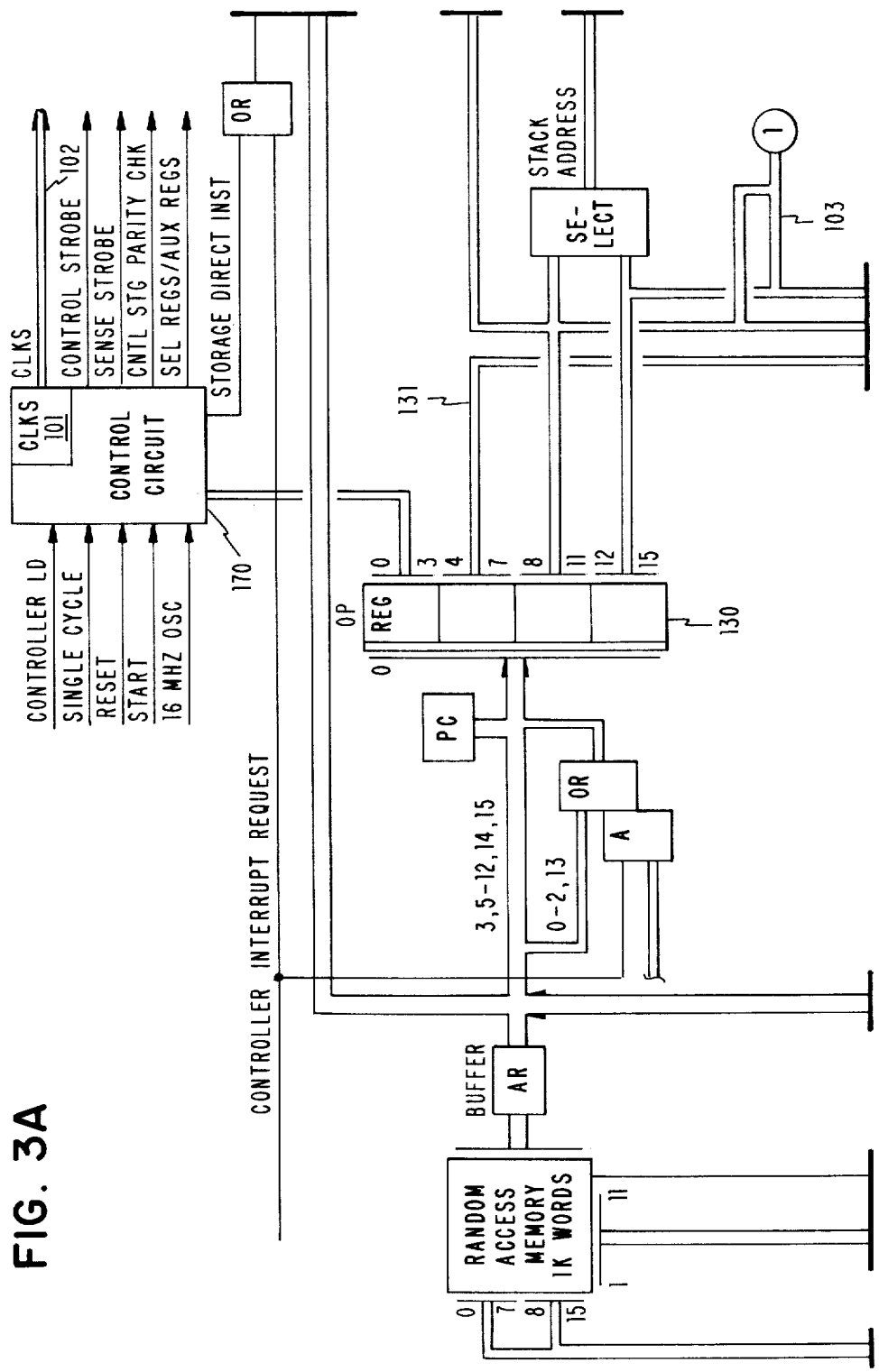
FIGS. 3A, 3B, 3C and 3D taken together as shown in FIG. 5 are a block diagram of the data flow of processor one.
Figure 3B:
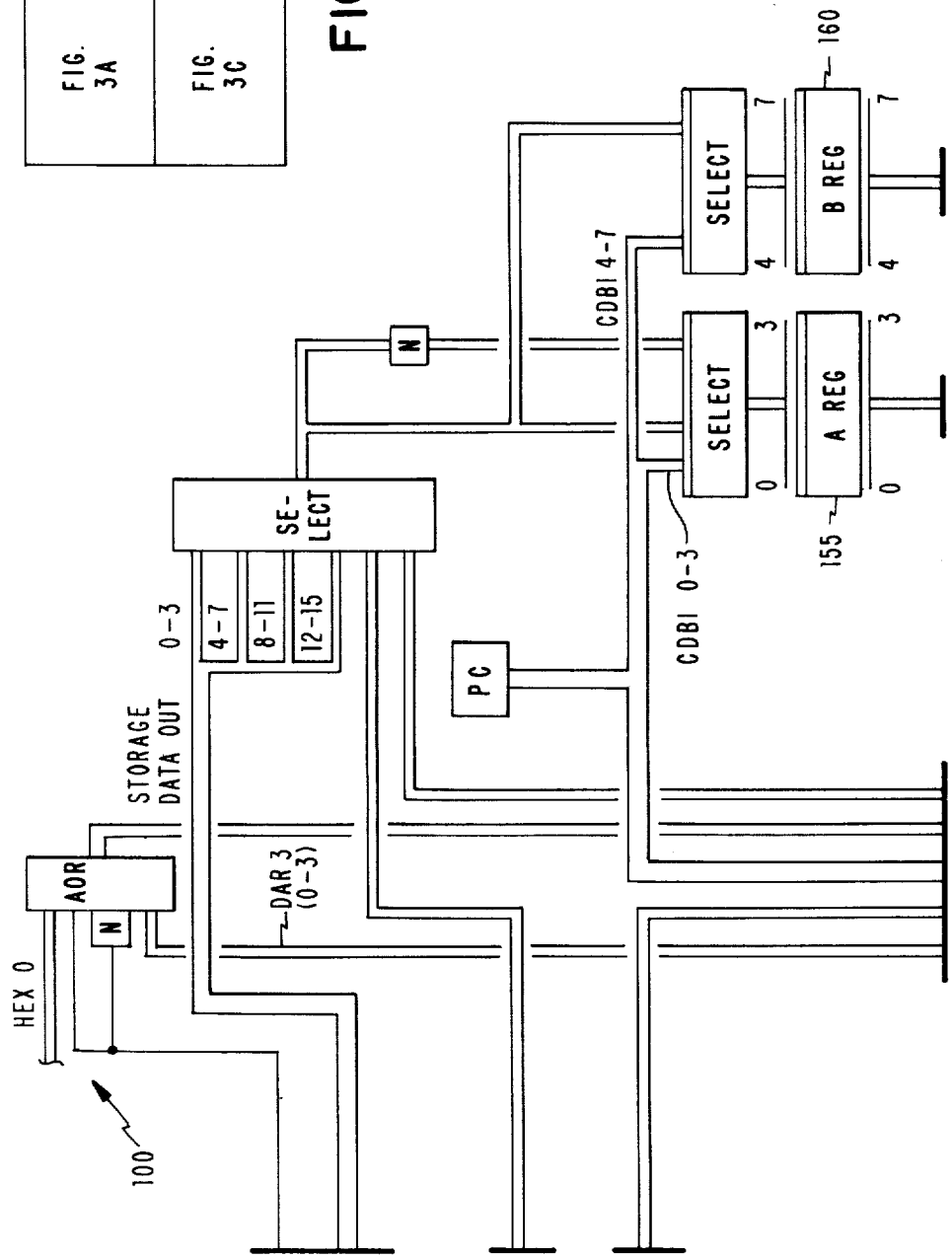
Figure 5:
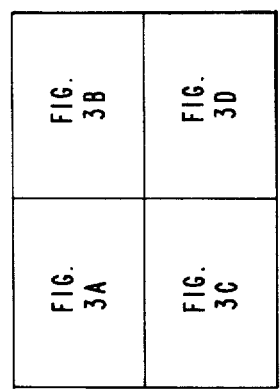
Figure 3C:
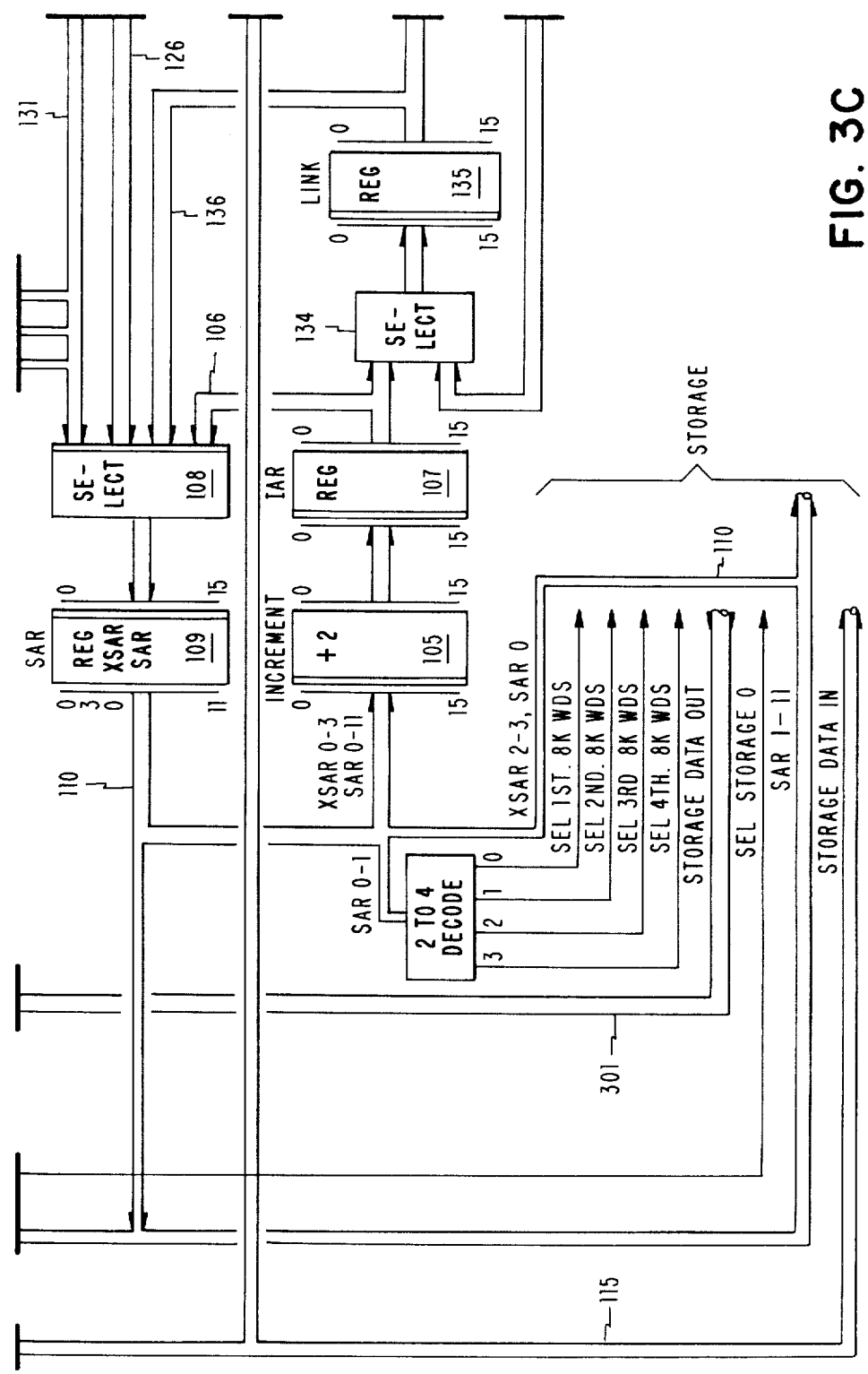

Instruction address register 107, FIG. 3C, is a 16-bit register for holding the address of the next sequential instruction to be executed. It is loaded from SAR 109 via bus 110 and incrementer 105. Incrementer 105 increments the values coming from SAR 109 by two so as to point to the next two byte word to be taken from storage.

Link register 135 FIG. 3C, is a 16-bit register for holding an address for the first level branch and link instruction. This register is loaded from IAR 107 via select logic 134 during the execution of a branch and link instruction. It can also be loaded from backup register 138, FIG. 3D, via bus 139 and select logic 134 when a return instruction is being executed and after the contents of link register 135 have been transferred to IAR 107.

Backup register 138 is a 16-bit register for holding an address for the second level branch and link. It holds the link address when two branch and link instructions are executed without an intervening return instruction.

Operation register 130, FIG. 3A, is a 16-bit register which is loaded with each instruction taken from storage which in this instance would be storage 300 or storage 400. The instruction held in register 130 is analyzed for controlling the flow of data for arithmetic and logic unit (ALU) operations, storage addressing, or general purpose register selection.

Figure 3D:
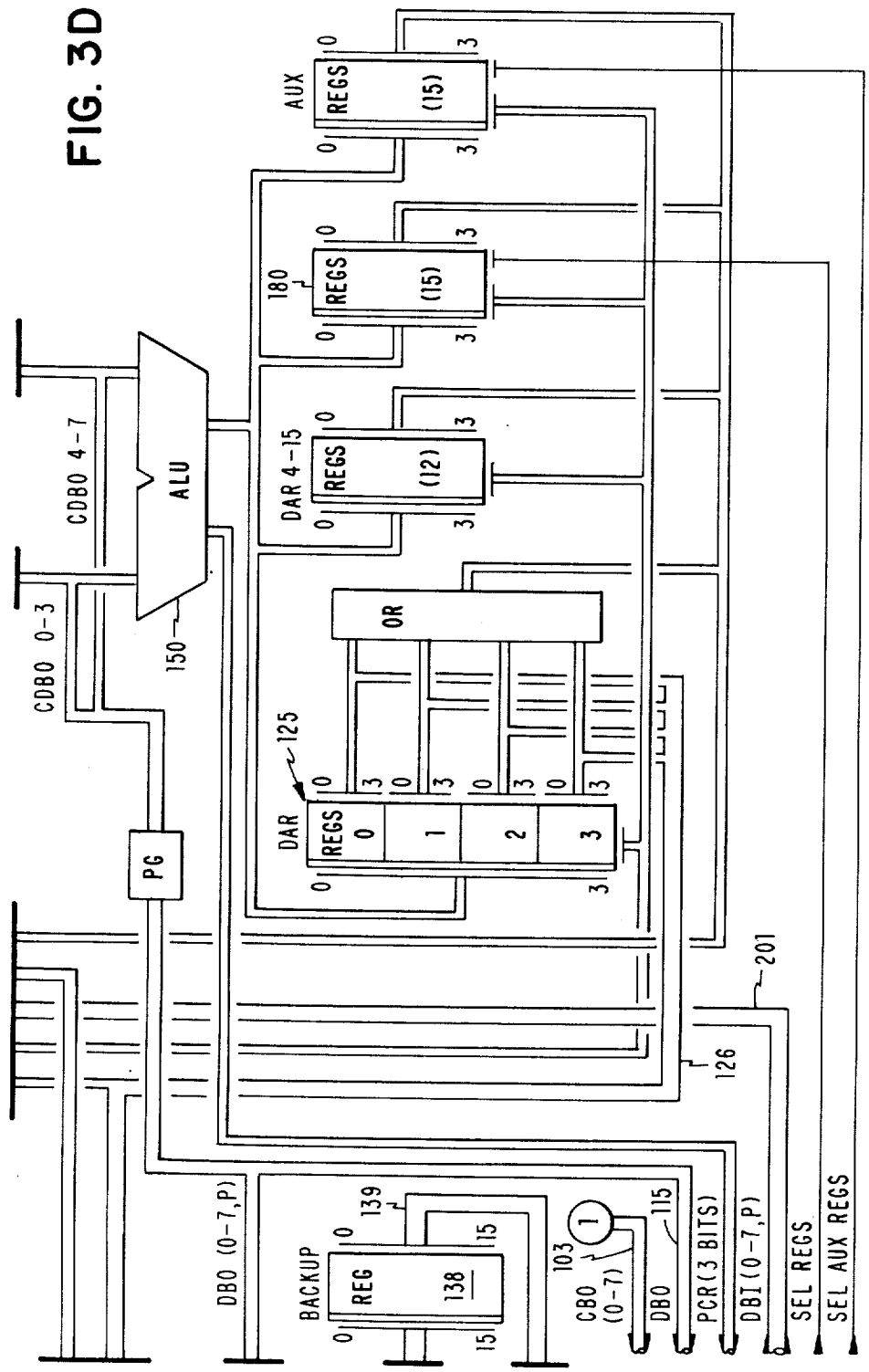

Arithmetic and logic unit 150, FIG. 3D, processes operands from A and B registers 155 and 160 respectively according to control signals received from control circuit 170, FIG. 3A, which is responsive to the OP code in OP register 130. The A and B registers 155 and 160 are each four bits wide, and in addition to holding operands for ALU operations, they hold data from DBI 201 or from storage via bus 301. The output of ALU 150, FIG. 3D, is four bits wide and is loaded into a general purpose register of registers 180 as selected by the contents of operation register 130. It should be noted that A and B registers 155 and 160 contain bits which are applied to DBO 115 for I/O output instructions or contain the data byte sent to storage via DBO 115 when a storage write instruction is executed.

The data address registers 0 through 3 of data address registers 125 contain the implied address for storage reference instructions.

In this particular instance, control 170 includes clock circuits 101 which provide clock signals on bus 102 for internal use within processor 100 and for processor 200. Of course, processor 200 could have its own clock generating circuitry. It should also be noted that FIGS. 3A, 3B, 3C and 3D primarily represent a data flow of processor 100 and all control signals are not shown.

In summary with respect to processor 100, it is seen that storage 300 or storage 400 can be addressed by an address placed by processor 100 on bus 110. Data is sent to storages 300 or 400 from processor 100 over data bus out (DBO) 115. Data on bus 115 comes from operand registers 155 and 160. Data from storages 300 and 400 enter processor 100 over bus 301. Data entering processor 100 from processor 200 is over data bus in 201 which is the data bus out for processor 200.

Figure 2:
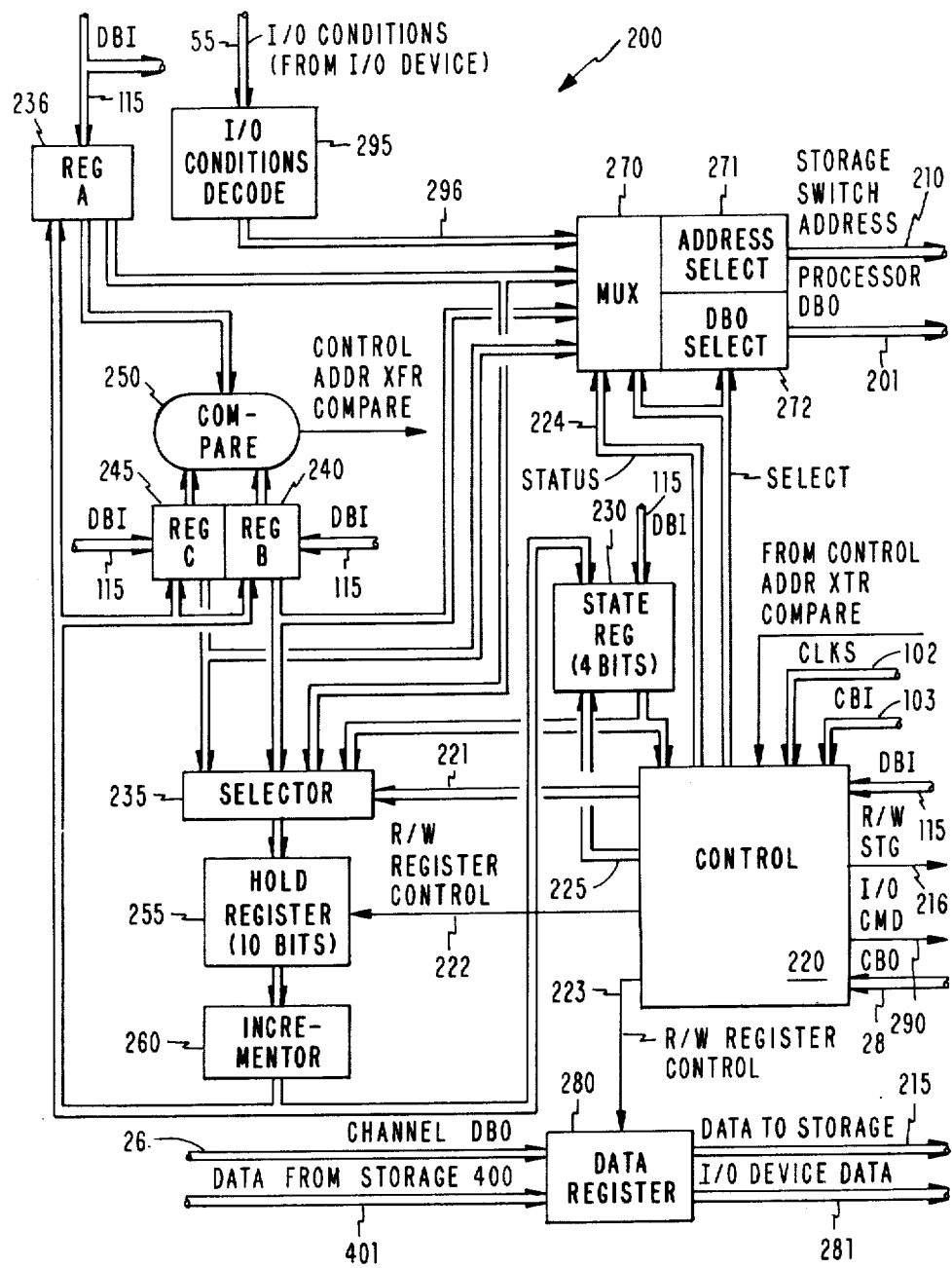
FIG. 2 is a block diagram illustrating the data flow of processor two.

Processor 200, FIG. 2, could be a processor like processor 100, but in this particular example, it is a simpler processor and is a processor of the type sometimes referred to as a state or hardware processor. Processor 200 includes control logic 220 which receives clock signals from processor 100 via bus 102, command signals from processor 100 over command bus in 103 and data from processor 100 over data bus in 115.

Data bus in 115 also loads state register 230 which is a 4 bit register for indicating the state of the processor 200. The output of state register 230 feeds into control 220 and into selector 235. Selector 235 also has inputs from A register 236, B register 240 and C register 245.

Selector 235 selects one of the inputs under control of signals from control 220 which are transmitted via bus 221. Selector 235 thus functions to pass selected inputs to a 10 bit hold register 255. Hold register 255 feeds incrementer 260. Thus, any of the registers 230, 236, 240 or 245 can be incremented, and the results can be written back into the same register, inasmuch as the output of incrementer 260 is applied to inputs of registers 230, 236, 240 and 245.

State register 230 provides 16 states, and the state is determined by the value currently held in register 230. Each state can cause a specific action to be taken within processor 200, and in this particular example, each state has a duration which is equal to the execution time for an instruction in processor 100. This is accomplished by utilizing the clocks from processor 100 which are received by control 220 via bus 102.

Register 236 is a 10 bit multipurpose register, i.e. a functional register or a data transfer register, and in addition to feeding selector 235, it feeds compare circuit 250 and multiplexer or selector 270. Multifunction register 240 in this particular instance is a 5 bit register and can function to hold data, for example, the high order part of a data transfer ending address. Register 240 feeds compare 250 and multiplexer 270. Multifunction register 245 is similar to register 240 but is a 4 bit register and can, for example, hold the low order part of a data transfer ending address. Register 240 also feeds compare 250 and multiplexer 270.

Comparator 250 functions to compare the low order 9 bits of register 236 with 9 bits obtained by concatenating the outputs of registers 240 and 245. Compare circuit 250 generates a control address transfer compare signal, CONTROL ADDR XFR COMPARE, which is applied to control 220. Control 220 uses this signal to cause state register 230 to be switched to a particular state via bus 225, thereby causing a jump and also for controlling multiplexer 270 and for selecting either the address select or the data bus out select circuits 271 or 272. It should be noted that control 220 also provides a R/W register control signal R/W Register CNTRL on line 222 for controlling the reading and writing of hold register 255, a R/W register control signal R/W Register CNTRL on line 223 for controlling the reading and writing of a data register 280, a R/W storage signal R/W STG on line 216 and an I/O command signal on line 290 for strobing data sent to I/O device 50 over bus 281.

Control 220, based upon the state represented by the contents of state register 230, controls multiplexer 270 to select one of the registers 236, 240, or 245 and the output of I/O conditions decode 295 as sources to form an address for addressing storage 400 which is passed through address select circuit 271 onto bus 210. Although the contents of registers 240 and 245 are concatenated for compare purposes, they are not for addressing of storage 400, i.e., either the contents of register 240 or 245 are used for storage addressing. If either register 240 or 245 is selected as a source for the storage address, then I/O conditions decode 295 is also selected as a source of address bits to complete the address for addressing storage 400.

Data register 280 is an 8 bit register which can be loaded from the system channel 20 via adapter 27 and channel DBO 26 or from storage 400 via bus 401. Data register 280 provides data to bus 215 which as it will be recalled, feeds storage switch 350 and provides data to I/O device 50 via bus 281. Of course, data on I/O device data bus 281 is entered into I/O device 50 only if control 220 is providing the I/O command signal on line 290. Similarly, data on bus 215 will not be written into storage 400 unless control 220 is providing a R/W storage signal on line 216.

I/O device 50 provides status or I/O condition signals on bus 55 which are applied to I/O conditions decode logic 295 of processor 200. Decode logic 295 provides signals to multiplexer 270 over bus 296. The decoded I/O condition can thus be transferred to processor 100 via multiplexer 270, DBO select logic 272 and bus 201. I/O device 50 can also transfer status conditions to processor 100 via bidirectional bus 41 and I/O device adapter 40. It should also be noted that control 220 can provide status data over bus 224 to multiplexer 270. This status data can then be transferred to processor 100 via DBO select logic 272 and bus 201.

Although state processor 200 is general, and can be used for controlling various I/O devices, it has been used to control a high speed on the fly type printer. Processor 200 is also used to transfer data at high speed from channel 20 into storage 400 for use by processor 100. In this particular instance, if processor 100 were to transfer the data, it would be doing so at a slower rate. Also by having processor 200 perform the data transfer, processor 100 is free to do other work such as printer carriage control and checking printer condition. Thus, while processor 100 is capable of performing more functions, processor 200 which is more limited, can accomplish its functions at high speed. The reason that processor 200 can accomplish a task at high speed is that although its state in which a task is accomplished has the same duration as the execution of an instruction in processor 100, it accomplishes a task during a single state whereas in processor 100, several instructions may be required to accomplished a task.

Figure 4:
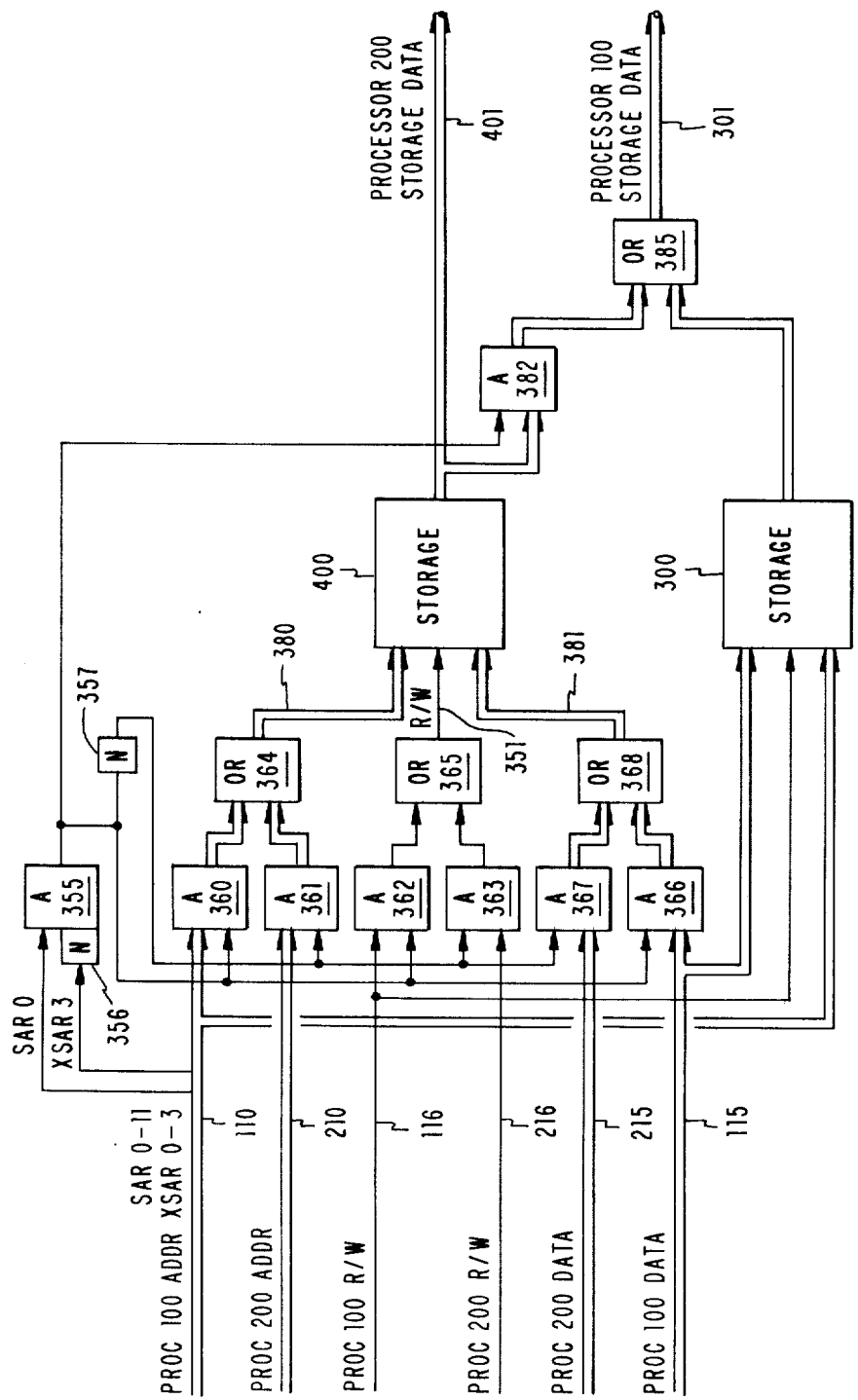
FIG. 4 is a detailed diagram of the storage switch shown in FIG. 1.

Storage switch 350, FIG. 4, is controlled by the states of the address bits on address bus 110 from processor 100. If address bit XSAR 3 is 0 and SAR bit 0 is 1, then storage 400 is being addressed by processor 100 and processor 200 is blocked from addressing storage 400. SAR bit 0 and XSAR bit 3 are applied from bus 110 to AND circuit 355; however, XSAR bit 3 is passed via inverter 356. The output of AND circuit 355 is used for conditioning address select AND circuit 360, read/write select AND circuit 362 and data select AND circuit 366. The output of AND circuit 355 conditions address select AND circuit 361, read/write select AND circuit 363 and data select AND circuit 367 via inverter 357.

Address select AND circuits 360 and 361 provide and address to storage 400 via OR circuit 364 and bus 380. Data is passed to storage 400 from data select AND circuits 366 and 367 via OR circuit 368 and bus 381. The read/write control signal on line 351 comes from OR circuit 365 which is fed by AND circuits 362 and 363.

Data read from storage 400 is entered into processor 200 via bus 401 and is also applied to AND circuit 382 which is conditioned under control of AND circuit 355. The output of AND circuit 382 is applied to OR circuit 385 which also receives data from storage 300. It should be noted that even though storage 400 is being addressed by processor 100 during a read operation, the data read from storage 400 will be sent to both processors 100 and 200. The data will be entered into register 280 of processor 200, FIG. 2, only if control 220 is applying a signal over line 223.

Processor 200 is particularly suited for the transfer of data from CPU 15 via channel 20 to storage 400. The data enters processor 200 via channel DBO 26 and is set into data register 280 in response to the R/W Register Control signal on line 223 from control 220. The R/W Register Control signal is generated by control 220 in response to signals from adapter 27 over command bus out (CBO) 28. The data in register 280 is then transferred therefrom to storage 400 over bus 215 via AND circuit 367 and OR circuit 368. The address used for specifying the position in storage 400 in which the data is to be stored, was loaded into register 236 from processor 100 via DBI 115. Processor 100, in this instance, determines where the data is to be stored.

The address in register 236 is passed to storage 400 via multiplexer 270, address select circuit 271, bus 210, AND circuit 361 and OR circuit 364. Control 220 provides signals to multiplexer 270 for selecting register 236 as a source and signals to address select circuit 271 for enabling the same to pass the address to bus 210. Control 220 also generates the R/W STG signal on line 216 for controlling the writing of the data into storage 400. The R/W STG signal on line 216 is applied to storage 400 via AND circuit 363 and OR circuit 365.

From the foregoing, it is seen that both processors 100 and 200 can access shared storage 400. Further, it is seen that processor 100 can access storage 300 while processor 200 is simultaneously accessing storage 400. It is also seen that if processor 100 is accessing storage 400, the address itself is used to prevent processor 200 from accessing storage 400. Processor 100, through its microprogram, is aware of the storage use pattern of processor 200. The microcode of processor 100 is structured to avoid the need to access storage 400 when processor 200 is accessing it. On the other hand, if processor 100 senses that processor 200 is in an error state, processor 100 can then access storage 400 to determine the conditions which caused the error state in processor 200.

Having thus described the invention, what is claimed as new, and desired to be secured by Letters Patent is:

1. The combination of a first processor, a second processor and a storage having first and second segments where said first and second processors and said storage operate at the same cycle rate, and where the first processor can address said first and second segments and said second processor can address only said second segment of storage, said first processor having priority over said second processor for addressing said second segment of storage, the improvement comprising:

means connected to receive addresses from said first processor and apply said received addresses to said first segment of storage, address selection means connected to receive addresses from said first and second processors and having an output for addressing said second segment of storage;

said address selection means being selectively operable in response to a first selection signal to pass an address presented by said first and not said second processor to said second segment of storage, and operable in response to a second selection signal to pass an address presented by said second processor to said second segment storage;

data selection means connected to receive data from said first and second processors, said data selection means being selectively operable in response to a first selection signal to pass data presented by said first processor to said second segment of storage and operable in response to a second selection signal to pass data presented by said second processor to said second segment of storage;

address decode means connected to receive an address from said first processor and generate a first selection signal when said address from said first processor is in a range to address said second segment of storage, and generate a second selection signal when said address from said first processor is outside the range to address said second segment of storage; and means for applying said first and second selection signals to said address selection and data selection means to render the same operable whereby said second processor with the presence of said second selection signal is able to address said second segment of storage simultaneously with the addressing of said first segment of storage by said first processor.

2. The combination of first and second processors and an addressable storage where said first and second processors and said storage operate at the same cycle rate and where said first processor can address all locations in said storage and said second processor can address less than all locations of said storage, said first processor having priority over said second processor for addressing said storage, the improvement comprising:

storage switch means having address and data inputs from said first and second processors and a data input from the storage locations addressable by both said first and second processors and having address and data outputs connected to the storage locations addressable by both first and second processors, said storage switch means being operable under control of first switch control signals to selectively apply address and data inputs from said first processor to said storage and to selectively pass data from said storage locations addressable by said first processor to said first processor, and operable under control of second switch control signals to selectively apply address and data inputs from said second processor to said storage, switch control means having an address input from said first processor and operable to generate said first switch control signals in response to said first processor addressing a storage location addressable by said second processor and to generate second switch control signals in response to said first processor addressing storage at a location not addressable by said second processor, and means for applying said first and second switch control signals to said storage switch means.

3. The combination of claim 2 wherein said switch control means comprises logic circuits.

4. The combination of claim 2 further comprising:

gate means connected to pass data to said first processor received from storage locations addressable only by said first processor or data passed by said storage switch means from storage locations addressable by both said first and second processors.

5. The combination of claim 4 where said gate means is a logical OR circuit.

* * * * *